May 7, 1929.  A. L. OLSON  1,712,161
FRENCH FRYER
Filed Oct. 27, 1927

Inventor
A. L. Olson
By
Attorneys

Patented May 7, 1929.

1,712,161

UNITED STATES PATENT OFFICE.

ARTHUR L. OLSON, OF RACINE, WISCONSIN.

FRENCH FRYER.

Application filed October 27, 1927. Serial No. 229,061.

This invention relates to a French fryer.

In French fryers as heretofore constructed, it has been the usual practice to provide prongs which extend from the front of the basket and are adapted to hook over the edge of the utensil with which the fryer is used and which also permits the positioning of the pan with the projecting hooks within the utensil. Necessarily, the utensil has to be of a great deal larger internal diameter than that of the basket in order to accommodate the hooks and consequently a large portion of the space within the utensil is wasted.

This invention is designed to overcome these defects and objects of such invention are to provide a novel French fryer in which the basket is so constructed that although it is provided with hooks that nevertheless it may be positioned within the utensil or saucepan with which it is used, and will occupy substantially the entire enterior of the saucepan without requiring this waste of space as has been noted above and as is required in the usual constructions.

Further objects are to provide a novel form of French fryer which permits more satisfactory and compact nesting of one basket within the other during shipping than has heretofore been possible, and in which there is no possible danger of the prongs from one basket catching in the basket immediately below.

Further objects are to provide a French fryer which is very simple to construct, which is easy to operate, and which although it utilizes the entire available space within the saucepan or other utensil nevertheless permits ready draining of the liquid from the articles being cooked.

An embodiment of the invention is shown in the accompanying drawings in which:—

Figure 1:
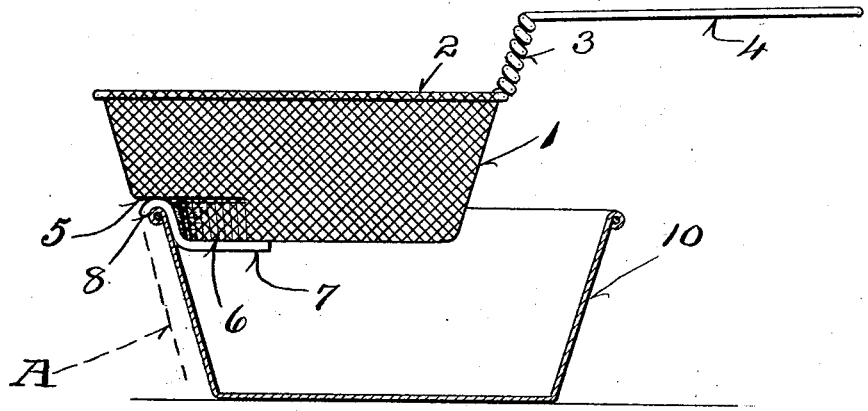
Figure 1 shows the position of the parts when the draining is taking place, the saucepan or other utensil being shown in section.

Referring to the drawings, it will be seen that the basket comprises a body portion 1 of open mesh, such for example as the open mesh wire work which is reenforced by means of a circular ring 2 formed of relatively heavy wire. The wire forming the ring is brought outwardly at the rear of the basket and upwardly and twisted to form the extension 3. It thereafter projects rearwardly to form the handle 4.

The body portion of the basket is approximately frusto conical but has an inset forming a shoulder 5 adjacent its front. This inset portion extends downwardly, as indicated at 6, and merges into the side walls of the basket.

Figure 2:
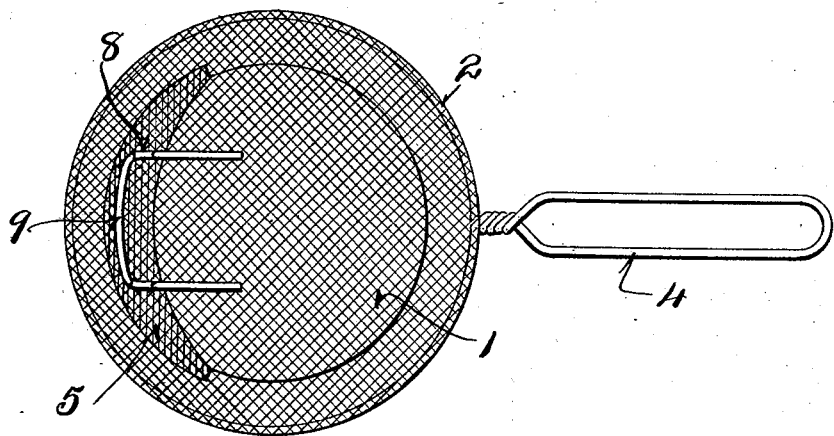
Figure 2 is a bottom view of the basket.

A double hook is provided and its rearwardly extending arms 7 are positioned below and secured to the bottom of the basket. The hook extends upwardly beneath the shoulder 5 and is provided with the hooked portions 8. They are joined, as shown in Figure 2, by means of the integral transverse member 9.

Thus it will be seen that the hooks are positioned within the outline of the basket, as may be seen from comparing the position of the hooks with the dotted line A (see Figure 1) which is a continuation of the line of the side wall of the basket.

In using the device, it is adapted to be positioned within a saucepan or other utensil 10 whose internal diameter is approximately the same as that of the basket 1 so that no wasted space is required. The hooks, it will be noted, lie within the outline of the basket and are positioned below the shoulder. Consequently, the basket may be positioned easily within a pan of approximately the diameter stated.

In addition to these points, the free and easy draining back into the saucepan after the basket has been lifted therefrom is readily permitted for the backet may be temporarily positioned, as shown in Figure 1, with the hooks engaging the edge of the saucepan, the operator merely holding the handle for an instant and allowing draining to take place.

In addition to the advantages just outlined, it will be also apparent that the baskets may be nested one within the other with the utmost facility as the hooks are positioned inwardly of the outline of the basket and consequently one basket may be readily positioned within the other. Further than this, by having the ends of the hooks joined, there is no danger of catching the hooks within the wire work or open work of the basket.

Further, the construction is very simple and may be easily produced.

It is to be understood that the hook structure 7 and 8 may be omitted and the basket may rest on its shouldered portion 5, if desired.

In addition to this, it is also to be noted that although the handle forms a rear support and the previously described structure forms a front support, that nevertheless it is within the province of this invention to provide an additional rear support which is adapted to engage the pan, if this is found necessary, although ordinarily the handle will furnish the requisite support as it is held by the operator.

Although the invention has been described in considerable detail, such description is intended as illustrative rather than limiting as the invention may be variously embodied and as the scope of such invention is to be determined as claimed.

I claim:

1. A French fryer comprising a wire work basket having a reenforcing upper ring and a rearwardly extending handle joined to said ring, said basket being provided with an inset front portion forming a shoulder, and a hook positioned immediately below said shoulder and within the outline of the basket.

2. A French fryer comprising an open work basket having an inset portion at its bottom and a wire loop attached to the bottom of the basket forming a hook adaped to engage the edge of the utensil, the hook being nested within the inset portion of the bottom.

In testimony that I claim the foregoing I have hereunto set by hand at Racine, in the county of Racine and State of Wisconsin.

ARTHUR L. OLSON.